Feb. 18, 1969   F. T. CHRISTIAN ET AL   3,428,377
BICYCLE HUB
Filed March 20, 1967

WITNESS:
Esther M. Stockton

INVENTORS
Frank T. Christian
Edwin Elliott Hood
BY
ATTORNEY

United States Patent Office 3,428,377
Patented Feb. 18, 1969

3,428,377
BICYCLE HUB
Frank T. Christian and Edwin Elliott Hood, Elmira, N.Y., assignors to The Bendix Corporation, a corporation of Delaware
Filed Mar. 20, 1967, Ser. No. 624,554
U.S. Cl. 308—192                                3 Claims
Int. Cl. F16c 33/00, 33/30; F16b 39/30

ABSTRACT OF THE DISCLOSURE

A bearing mounted bicycle hub assembly mounted on a shaft or axle adapted to be fixed in a bicycle frame. The invention particularly relates to locking means formed by a discontinuity in rolled threads to provide an area of limited resistance to bearing support cones or nuts. The arrangement provides a low cost means of obtaining cone adjustment locking.

Brief summary

Prior art bicycle hub cone locking means are shown in U.S. Patent 3,131,008 and consist of a raised spline formed on the support shaft. Such locking means are functionally effective, but do not represent the ultimate in terms of low cost since special fluting or spline forming operations are required. The present invention provides a different locking concept by providing an interruption in rolled teeth which arrangement essentially has no cost increment apart from that connected with a change in forming dies.

Figure 1:
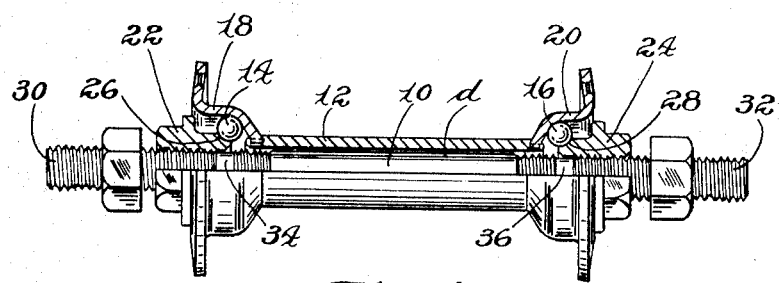
FIGURE 1 is a cross-sectional view of a bicycle hub assembly containing locking means of the present invention.

Referring to the drawings, there is illustrated a bicycle hub assembly comprised of an axle or support shaft 10, a hub member 12 concentrically disposed about shaft 10. First and second annular rolls of ball bearings 14 and 16 support the flanges 18 and 20 respectively. Each flange is rigidly secured to hub member 12. The ball bearings are each supported by first and second threaded nuts or cones 22 and 24 which have conical surfaces 26 and 28 forming inner bearing races. The cones 22 and 24 are preferably cold forged members which, except for internal thread, are formed without matching (metal removal) operations which contributes towards the basic low cost objective of our hub design.

Figure 2:
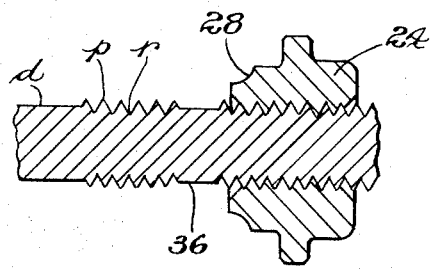
FIGURE 2 shows a fragmentary section of support shaft and bearing support cone or nut illustrating, in particular, relative relationship between shaft diameter and thread roots and peaks.

Shaft 10 is threaded on each end 30 and 32, respectively, extending through a region from shaft end to axially within the bearings. The threaded sections are rolled threads, best shown in FIGURE 2, where thread root, R, extends below the basic shaft diameter D and thread peak P is greater than D. Each threaded area 30 and 32 has a discontinuity or section 34, 36 which is of basic shaft diameter D. The discontinuous sections may be most conveniently formed in rolling dies so that entire thread configuration, including discontinuity, is formed in one rolling operation. Each discontinuous section is located radially of the respective bearings 14 and 16 in the assembled condition. As the nuts or cones 22 and 24 are threaded on the shaft, they cut through and form their own threads through the discontinuous sections. The discontinuous sections are controlled so that limited, but firm, adjustment holding resistance is provided. In this connection, it will be observed that the inherent form of rolled threads on shaft 10 leaves the basic shaft diameter approximately that of thread pitch diameter. Thus, as the cone threads cut into the discontinuity, there is room for metal to flow, thus avoiding a thread freeze-up condition. Also, the degree of holding resistance can be controlled by the width of discontinuity.

If desired for additional locking effect, the shaft threaded sections on either side of a discontinuity may be made out of phase; i.e. thread inwardly of discontinuity is not a continuation of thread outwardly of the discontinuity. In this case, as the thread cut through the unthreaded portion and attempted to engage the second section of thread, an additional interference would exist. This additional interference may be of various controlled amounts depending of the selected thread phasing.

It will be recognized that a means for providing holding resistance may be provided by a discontinuity left in the thread rolling operation. No additional forming operations are required and the inherent properties of a rolled thread and adjacent discontinuity are utilized to obtain the invention's objectives.

We claim:
1. A bicycle hub assembly comprising:
   a support shaft;
   a rotatable hub member concentrically disposed about said support shaft;
   first and second ball bearing means adjacent opposite ends of said hub member for providing low friction bearing support for said hub member;
   first and second threaded nut members each having a bearing support surface formed thereon to provide inner bearing race support surfaces for said first and second ball bearings respectively;
   said support shaft having threaded sections formed at each end having thread roots extending below the diameter of said support shaft and thread peaks of a diameter greater than shaft diameter;
   each of said threaded sections having a discontinuity of unthreaded shaft intermediate the ends of said threaded sections, said discontinuities disposed generally radially inwardly of each of said first and second bearing means; and
   said first and second nut members threadedly mounted on opposite ends of said shaft respectively, each encountering a limited adjustment locking resistance at said discontinuities.

2. A bicycle hub as claimed in claim 1 wherein said first and second threaded nut members are formed from cold forged members.

3. A bicycle hub as claimed in claim 1 wherein portions of said threaded sections on opposite sides of the discontinuities are out of phase to provide additional locking resistance.

References Cited

UNITED STATES PATENTS

| | | | |
|---|---|---|---|
| 582,861 | 5/1897 | Henry et al. | 308—192 |
| 609,371 | 8/1898 | Schroeder | 308—192 |
| 2,360,826 | 10/1944 | Cherry | 151—14.5 |
| 3,131,008 | 4/1964 | Dian | 308—192 |

CARROLL B. DORITY, Jr., *Primary Examiner.*

U.S. Cl. X.R.

308—236; 151—14, 22